United States Patent
Meckelburg

(10) Patent No.: US 7,747,404 B2
(45) Date of Patent: Jun. 29, 2010

(54) METHOD FOR THE ANALYSIS, CONTROL, AUTOMATION AND INFORMATION MANAGEMENT OF LIFE-CYCLE PROCESSES OF TECHNICAL PRODUCTS

(75) Inventor: Hans-Jürgen Meckelburg, Wuppertal (DE)

(73) Assignee: 7 Layers AG, Ratingen (DE)

( * ) Notice: Subject to any disclaimer, the term of this patent is extended or adjusted under 35 U.S.C. 154(b) by 713 days.

(21) Appl. No.: 11/704,415

(22) Filed: Feb. 9, 2007

(65) Prior Publication Data

US 2007/0220491 A1 Sep. 20, 2007

(30) Foreign Application Priority Data

Feb. 16, 2006 (EP) .................................. 06003194

(51) Int. Cl.
*G06F 17/40* (2006.01)
(52) U.S. Cl. .............................. 702/81; 702/82; 702/84; 702/187; 709/217; 709/218; 434/118; 434/322; 434/323; 715/705; 715/708; 715/709; 705/1; 705/7; 705/10; 705/27
(58) Field of Classification Search .................... 702/81, 702/82, 84, 187; 434/107, 108, 365, 380; 705/1, 7, 10, 26, 27, 44, 4, 32, 29, 500; 715/705, 715/706, 707, 714, 715, 762, 708, 709; 709/217, 709/218
See application file for complete search history.

(56) References Cited

U.S. PATENT DOCUMENTS

| | | | | |
|---|---|---|---|---|
| 5,041,972 A | * | 8/1991 | Frost ............................ | 705/10 |
| 5,442,759 A | * | 8/1995 | Chiang et al. ................... | 705/1 |
| 5,999,908 A | * | 12/1999 | Abelow .......................... | 705/1 |
| 6,144,848 A | * | 11/2000 | Walsh et al. ................. | 455/419 |
| 6,148,065 A | * | 11/2000 | Katz .......................... | 379/88.2 |
| 6,453,254 B1 | * | 9/2002 | Bullwinkel et al. ........... | 702/81 |
| 7,133,834 B1 | * | 11/2006 | Abelow ........................ | 705/10 |
| 2004/0177002 A1 | * | 9/2004 | Abelow ........................ | 705/14 |
| 2007/0043632 A1 | * | 2/2007 | Abelow ........................ | 705/27 |
| 2008/0028394 A1 | * | 1/2008 | Stich et al. ................... | 717/177 |

* cited by examiner

*Primary Examiner*—Carol S Tsai
(74) *Attorney, Agent, or Firm*—Collard & Roe, P.C.

(57) ABSTRACT

A method for the analysis, control, automation, and information management of life-cycle processes of technical products includes an engineering process, an analysis process, a test process, and accesses an information system. The engineering process, the analysis process and the test process, which includes a plurality of test modules, have connections for information exchange exclusively to the control process and information system. For every test of the test modules, the scope and form of the input and output values are determined by data stored in the information system. The data that are input into the engineering process and determined, and the specified values, are processed by the process control, which determines all of the tests to be carried out. The results are passed on to the process control. The analysis process determines if data and specified values input in the engineering process have been reached by a numerical or numerical/statistical calculation.

9 Claims, No Drawings

METHOD FOR THE ANALYSIS, CONTROL, AUTOMATION AND INFORMATION MANAGEMENT OF LIFE-CYCLE PROCESSES OF TECHNICAL PRODUCTS

BACKGROUND OF THE INVENTION

1. Field of the Invention

The invention relates to a method for the analysis, control, automation, and information management of life-cycle processes of technical products, particularly in the case of complex products such as in the sector of telecommunications, for example. The life cycle typically begins with the planning and development of a new product, includes steering and improvement of the product that has been introduced onto the market, and ends, for example, after production and sale have ended, with the cessation of technical support for end customers.

2. The Prior Art

The development of high-technology products, such as mobile telephones or other electronic devices, for example, is complicated and labor-intensive, due to the complexity of these products, and makes it necessary to take a plurality of technical and economic facts into consideration. Thus, for example, scientific and technical formulas, specified values from industrial standards, and other technical expert knowledge must be taken into consideration, just as much as production-related restrictions, customer desires, and specified values in terms of design and economics. Within the framework of such product development, whether or not the technical requirements have been met is checked by different kinds of product tests, for example on prototypes or also by computer simulation, and then the results of these tests are utilized within the framework of product development, in an iterative, incremental method of procedure, for further improvement of efficiency.

However, with the market introduction of a technical product, feedback from business partners, dealers and end customers, and, in the case of telecommunications end products, also from the network operators, must be taken into consideration for improving the product, so that modified product versions or models can be developed in accordance with demand. Often, the importance of individual characteristics that exist or of characteristics that have not been provided can only be derived from the reactions of the market.

During the life cycle of a product, technical support, including repair and maintenance, the provision of accessories and replacement parts, and, for example, also disposal or recycling of old devices, must be coordinated.

In the case of the methods for controlling and evaluating testing and development systems in the product development of a product having a complex structure, teams of experts are usually involved in the development, the testing, and the analysis of the test results. The type and scope of the tests to be carried out, in particular, must also be established by the experts, taking specific technical knowledge into consideration, as a function of the various specified values, the analysis results, the market conditions, and the status of development. In this connection, it must be considered that the reliability of the test results increases by means of comprehensive tests, but this causes the costs and the development period to increase.

In order to allow a goal-oriented and systematic procedure in the case of complex products, a step-by-step procedure, to a great extent, is required with the known methods. In this connection, individual partial aspects of the product development are worked on sequentially, one after the other, by different teams of experts. This procedure is also called a waterfall model in the technical literature. In the case of such a procedure and the involvement of different teams of experts, it is only possible to determine the precise interaction of different partial aspects and product characteristics with great effort.

SUMMARY OF THE INVENTION

It is therefore an object of the invention to increase the efficiency of a method for the analysis, control, automation, and information management of life-cycle processes of technical products, particularly in the case of complex products such as in the sector of telecommunications. In particular, it is an object of the invention to reduce the costs and the duration of product development, and increase the reliability and the reproducibility of the method.

This object is accomplished according to the invention, by a method for the analysis, control, automation, and information management of life-cycle processes of technical products, in which method data are processed by a computer system, preferably a networked computer system, and the method comprises an engineering process, an analysis process, a test process, and a control process. The method accesses an information system, whereby the engineering process, the analysis process, and the test process have connections for information exchange exclusively to the control process and to the information system, and therefore are not directly connected with one another. The test process comprises a plurality of test modules that can carry out different tests, in each instance, and the totality of the possible tests is stored in the information system. The scope of the test and the form of the input and output values of the test are clearly determined, for every test of the test modules that is provided, by means of the data stored in the information system. The data that are input into the engineering process and determined, and the specified values, are processed by the process control, which determines all of the tests to be carried out by the test modules of the test process, on the basis of the data stored in the information system. The results obtained by the test modules during the test process are stored in the information system and used in the analysis process, and the analysis process exclusively accesses the data made available by the process control and by the information system, and determines that the data and specified values input in the engineering process have been reached, by means of a numerical or numerical/statistical calculation. Scientific and technical formulas, specified values from industrial standards, as well as other expert knowledge are exclusively implemented as data of the information system and selection rules of the process control.

The individual processes of the method are separate from one another, and the data are related by means of associations. Although the implementation of the scientific and technical formulas, the specified values from industrial standards, as well as the other expert knowledge as data of the information system and selection rules of the process control is connected with increased effort, at first, this makes the method reproducible and it can be used for different products of a product class, in a simple manner. After implementation of the method, the duration of product development is thereby reduced, among other things, due to the high degree of automation. The method according to the invention is also particularly suitable for the further development and quality assurance of products after their market introduction, and feedback with regard to the quality and the function of a product can be implemented as data of the information system and selection rules of the process control, thereby making it possible to further optimize the products and to allow improved product development of new products. The method according to the invention can be dynamically adapted and improved in all phases, by adding selection rules and newly occurring data and associations.

According to the invention, scope and form are clearly determined for every test provided, by the data stored in the information system. The selection of the tests provided corresponds to a transformation of the data stored in the information system. In this connection, individual tests can be assigned to typically determined test cases, also called Test Cases (TCs), whereby a test case comprises a group of individual tests, which differ only in the establishment of individual test parameters. Within the framework of the method according to the invention, the individual tests to be carried out can be determined directly by a single transformation, from data in the information system. Alternatively, the test cases to be carried out can be first determined on the basis of the data of the information system, and subsequently, the individual tests to be carried out are automatically selected for every test case. In the determination of the tests to be carried out, the availability, the capacity utilization, and the utilization costs of the various test resources, in particular, can be taken into consideration. In the utilization of a test resource for different products, for example, the time progression can also be automatically established within the framework of the method according to the invention, in the form of a test plan.

The analysis process, which exclusively accesses the data made available by the process control and the information system, processes data that were previously obtained by the test process. The analysis process thereby allows a back-transformation of the test results to the product properties. Since individual test results usually cannot be clearly assigned to data and specified values that were input in the engineering process and determined, the back-transformation is not clear, and typically takes place by means of a numerical/statistical calculation. Proceeding from the data determined in the analysis process, errors can be eliminated in the engineering process, in the development of a new version of the technical product or an individual component of the technical product, and specific product properties can be changed in a targeted manner. Because of the holistic approach of the method according to the invention, the further development of different product versions can be reproducibly followed up over the entire life cycle, and the interactions of different components of the technical product can also be investigated.

In a preferred embodiment of the method according to the invention, the computer system is built up of computer components that are connected by way of a network. Thus, the computer components can be connected by means of a LAN and/or a VPN. In this manner, the computer components can be distributed over a building, for example, or also over several locations. Within the framework of the invention, individual computer components or also all of the computer components of a computer system can be connected by way of the Internet, by means of an Internet protocol (IP connection). In this manner, in a preferred embodiment of the invention, external test modules can be included in the test and development system, thereby making it possible to achieve a maximal capacity utilization of the available resources. For example, expensive test resources, which can also be made available by independent service enterprises, can be included in different test and development systems, and optimally utilized in this manner. Aside from making external test resources available, the information system or parts of the process control and the analysis process can also be updated, supplemented, or even made available, in whole or in part, by way of the Internet.

Within the framework of the method according to the invention, web services can be included in the computer system, in an advantageous embodiment. A web service is a software application that can be accessed by way of an Internet protocol, for example HTTP, by a client program. In this connection, the data exchange takes place by way of defined interfaces, for example using XML-based messages. Web services guarantee a high level of security, because of the clear separation of service provider and service user (client), and use is generally not prevented by the presence of a firewall. Not only parts of the information system but also test resources can be made available by a web service, without restriction.

In an advantageous embodiment of the method according to the invention, an information process for outputting data to a user is provided. By means of this information process, the experts and decision-makers who are involved in product development can be informed about the development status. This information can be produced automatically by the information process, or called up by means of input by the user.

There are different possibilities for implementing the tests of the individual test modules to be carried out on a product within the framework of product development. Thus, it is possible for the test of a test module to be carried out by an operator, and the scope of the test, the test parameters, and the form of input of the results determined in the test are set by the operator of the test module. Preferably, an input and output mask of a computer component of the computer system, assigned to the test module, is used for this purpose. In this input and output mask, the test parameters can be precisely listed, for example, and fields for inputting the results determined can be provided. It is also possible for the operator to perform the test with step-by-step instructions, by means of such an input and output mask. The demands on the technical knowledge of the operator and the risk of incorrect operation can be reduced by means of precisely indicating the test parameters.

Because the tests to be carried out are determined completely by the process control, completely automated implementation of the test of the individual test modules, by a measurement or testing arrangement that is directly controlled by the test process and passes the results directly on to the test process, is also possible. The tests of the individual test modules to be carried out on a product can also be carried out by a measurement or testing arrangement and an operator, and part of the test parameters is sent to the measurement or testing arrangement, and the other part of the test parameters is sent to the operator. The results are passed on to the test process by the measurement or testing arrangement and/or the operator. In this connection, the instructions to the operator can range from the simplest instructions, for example instructions to put in a test pattern, all the way to complicated instructions that must be carried out by an expert. A high degree of reproducibility is achieved by means of this procedure, even in the case of tests that cannot be fully automated.

In order to improve the method, a commenting system can also be provided, with which certain product properties can be commented. It is practical if use of the commenting system is made possible for an expanded group of persons, including business and sales partners. Comments concerning a product property are stored in the information system as data, and can be taken into consideration in the development of a new product version for example, during the engineering process, when inputting specified values. Furthermore, expert knowledge can also be gained from comments, which knowledge becomes part of the analysis, control of automation of life-cycle processes, according to the invention, in the form of selection rules of the process control and data of the information system.

Software that was created using an object-oriented programming language, for example UML (Unified Modeling Language), is particularly suitable for processing the data with the computer system. The terms used are oriented on the basis of the designations known from the sector of object-oriented programming. Thus, the information system can also be called a reference database, and the data can be called data.

DETAILED DESCRIPTION OF THE PREFERRED EMBODIMENT

In the following, the invention will be explained using an example that serves only as an example and not a measure of the limits of the invention.

EXAMPLE

In the following, the method according to the invention, for the analysis, control, automation, and information management of life-cycle processes of technical products, is used for the product development of a new mobile telephone. In a first stage of the engineering process, product properties with regard to the product to be developed are established. In the case of a mobile telephone, the radio network standards that are supported by the telephone must be established, in particular. Aside from a number of transmission frequencies for voice transmission in a GSM network, support of a UMTS and a GPRS network for data transmission can also be provided, for example. For communication with other technical devices, various interface standards such as a connection via a USB cable or also wireless connections via WLAN, Bluetooth, or infrared, for example, are also possible. Also, various additional multimedia functions such as a photo and/or video camera function or playing of MP3 files and a radio program can also be provided for a mobile telephone. Aside from these various options, the dimensions and the design of the mobile telephone are also determined in the first stage of the engineering process. The individual product properties are directly related to one another and determine additional properties, such as the maximal stand-by and operating time, for example. The various specified values and options are input into computer components of a computer system at the beginning of the engineering process, and part of the options are queried using an input and output mask, by means of which a development engineer can directly select the desired options.

Using the values established at the beginning of the engineering process, the computer system establishes the layout of a prototype, taking into consideration the data stored in the information system, and the process control selects the tests to be carried out by the test modules of the test process, from the totality of the possible tests. All of the scientific and technical formulas, specified values from industrial standards, as well as other expert knowledge, are implemented exclusively as data of the information system and selection rules of the process control. In this manner, the scope and the sequence of the individual tests are also established in reproducible manner. The individual tests can be carried out completely automatically, for example within the framework of a simulation, or also with the involvement of an operator. For example, an operator can be instructed to provide specific input to a prototype, while a measurement apparatus, for example an oscilloscope or a spectrum analyzer, records the processing of the input by the electronics of the mobile telephone.

If the tests are carried out automatically, an appropriate interface must be provided for controlling a test object, which, in the case of a mobile telephone, usually takes place by a user. In the sector of telecommunications, use of the so-called AT command set for controlling terminals, which comes from the modem sector, has proven itself. Additionally or alternatively, an agent in the form of software can also be installed in the memory of the mobile telephone and connected with the operating system of a mobile telephone. The agent accesses the device functions and makes a configurable input and output interface available for external control. Finally, manufacturer-specific interfaces for control are also known. By means of the method according to the invention, interfaces configured in different ways, which are also called Electrical Man Machine Interfaces (EMMI), can be adapted to a common, uniform, overriding control.

Tests of electromechanical properties such as field intensity distribution, transmission and reception power, and testing of electromagnetic compatibility (EMC test), in particular, require great effort in terms of apparatus. With the method according to the invention, prototypes can be studied in measurement devices of external testing laboratories, where the measurement devices are connected to the test and development system by way of a network, using an assigned computer component. Aside from a connection by way of a VPN, other IP connections for connecting the computer component via the Internet are also possible. Additionally or alternatively to the connection of external test modules, for example, updating of the information system by way of the Internet can also be provided.

The data determined in the test process are passed on to the process control. In an analysis process, which exclusively accesses the data made available by the process control and information system, it is determined whether the data that were input in the engineering process, and the specified values, have been reached, by means of a numerical or numerical/statistical calculation. As a function of whether or not the specified values are reached, the layout of the mobile telephone is iteratively adapted in the further progression of the product development, in several development, test, and analysis cycles. The properties of different product versions are precisely recorded by the method according to the invention. In connection with the support of different product versions, in particular, different methods of procedure can occur during troubleshooting and error correction, as a function of the version.

Even after market introduction of the mobile telephone developed using the method according to the invention, the life cycle of the mobile telephone is steered by the method according to the invention. In addition to the development carried out earlier, further improvement and optimization possibilities can occur during the life cycle of the mobile telephone. All of the additional expert knowledge that results from ongoing product development, for example, and that is relevant for a product or product group, must be implemented as data of the information system and selection rules of the process control. By means of this method of procedure, greater reproducibility and economical control and evaluation of the life-cycle processes is guaranteed during the entire product development. Furthermore, the development of new products is significantly facilitated by an expansion and refinement of the information system and the selection rules of the process control.

Experience has shown that in the case of a successor product, even in the case of an extensively new development, components that are already known, for a large part, and investigated thoroughly, are used, some of them slightly modified. The data that were determined during the life cycle of a prior product can therefore be utilized, to a great extent, thereby making it possible to clearly reduce development time and costs.

Accordingly, while only a few embodiments of the present invention have been shown and described, it is obvious that many changes and modifications may be made thereunto without departing from the spirit and scope of the invention.

What is claimed is:

1. A method for the analysis, control, automation, and information management of life-cycle processes of technical products, in which method data are processed by a computer system, the method comprising:

carrying out an engineering process;
   carrying out an analysis process;
   carrying out a test process;
   carrying out a control process;
   accessing an information system; and
   prototyping and manufacturing said technical products based on data obtained from the engineering, analysis, test and control processes;
   wherein the engineering process, the analysis process, and the test process are connected exclusively to the control process and to the information system for information exchange, and are not directly connected with one another,
   wherein the test process comprises a plurality of test modules that each carry out different tests, and a totality of possible tests is stored in the information system,
   wherein a scope of the test and the form of input and output values of the test are clearly determined, for each test of the test modules that is provided, by means of data stored in the information system,
   wherein the data that are input into the engineering process and determined, and specified values, are processed by the process control, which determines all of the tests to be carried out by the test modules of the test process, on the basis of the data stored in the information system,
   wherein results obtained by the test modules during the test process are stored in the information system and used in the analysis process,
   wherein the analysis process exclusively accesses data made available by the process control and by the information system, and determines whether the data and specified values input in the engineering process have been reached, by means of a numerical or numerical/statistical calculation, and
   wherein scientific and technical formulas, specified values from industrial standards, as well as other expert knowledge are exclusively implemented as data of the information system and selection rules of the process control.

2. A method according to claim 1, wherein the computer system is built up of computer components that are connected via a network.

3. A method according to claim 2, wherein the computer components are connected, at least in part, by means of a local area network (LAN) or virtual private network (VPN).

4. A method according to claim 2, wherein the computer components are connected, at least in part, via the Internet.

5. A method according to claim 4, wherein the Internet provides a connection to an external test module, or updating of the information system, as well as parts of the process control and the analysis process.

6. A method according claim 1, further comprising the step of providing an information process for outputting data to a user, wherein a type, representation, and amount of output data are predetermined by data of a reference database or selected by an input by the user.

7. A method according to claim 1, wherein the tests of the individual test modules to be carried out on a product are carried out, at least in part, by an operator, and a scope of the each test to be carried out, test parameters, and a form of input of results determined in the test by the operator are predetermined by the test module in the form of an input and output mask of a computer component of the computer system assigned to the test module.

8. A method according to claim 1, wherein the tests of individual test modules to be carried out on a product are carried out, at least in part, by a measurement or testing arrangement, which are directly controlled by the test process, and directly pass results determined on to the test process.

9. A method according to claim 1, wherein the tests of individual test modules to be carried out on a product are carried out, at least in part, by a measurement and testing arrangement, and an operator, and wherein part of the test parameters are passed on to the measurement and testing arrangement, and the other part of the test parameters to the operator, and wherein the results are passed on to the test process by the measurement or testing arrangement or the operator.

* * * * *